United States Patent
Dai et al.

(10) Patent No.: US 11,851,732 B2
(45) Date of Patent: Dec. 26, 2023

(54) METHOD FOR PREPARING GRID ALLOY OF LEAD BATTERY

(71) Applicant: Tianneng Battery Group Co., Ltd., Zhejiang (CN)

(72) Inventors: Fei Dai, Zhejiang (CN); Qing Liu, Zhejiang (CN); Genfang Gao, Zhejiang (CN); Qiushi Yao, Zhejiang (CN); Xufeng Tang, Zhejiang (CN); Shu Hu, Zhejiang (CN); Wenwei Zhou, Zhejiang (CN); Zhenglin Xiong, Zhejiang (CN); Dan Li, Zhejiang (CN); Qingshan Tian, Zhejiang (CN)

(73) Assignee: TIANNENG BATTERY GROUP CO., LTD., Zhejiang (CN)

( * ) Notice: Subject to any disclaimer, the term of this patent is extended or adjusted under 35 U.S.C. 154(b) by 729 days.

(21) Appl. No.: 16/965,770

(22) PCT Filed: Oct. 26, 2018

(86) PCT No.: PCT/CN2018/112133
§ 371 (c)(1),
(2) Date: Jul. 29, 2020

(87) PCT Pub. No.: WO2019/153795
PCT Pub. Date: Aug. 15, 2019

(65) Prior Publication Data
US 2021/0040583 A1  Feb. 11, 2021

(30) Foreign Application Priority Data
Feb. 6, 2018 (CN) .......................... 201810116166.8

(51) Int. Cl.
*C22C 1/03* (2006.01)
*C22C 11/06* (2006.01)
(Continued)

(52) U.S. Cl.
CPC ................ *C22C 1/03* (2013.01); *C22C 11/06* (2013.01); *C25C 3/36* (2013.01); *H01M 4/685* (2013.01); *H01M 4/73* (2013.01)

(58) Field of Classification Search
CPC .......... C22C 1/03; C22C 11/06; H01M 4/685; H01M 4/73; C25C 3/36
See application file for complete search history.

(56) References Cited

FOREIGN PATENT DOCUMENTS

| | | | |
|---|---|---|---|
| CN | 1447467 A | 10/2003 | |
| CN | 1556252 A | 12/2004 | |

(Continued)

OTHER PUBLICATIONS

Examination Report Under Sections 12 & 13 of the Patents Act, 1970 and the Patent Rules, 2003; Government of India; Oct. 5, 2021; 6 pages.

(Continued)

*Primary Examiner* — Anthony M Liang
*Assistant Examiner* — Jacob J Gusewelle
(74) *Attorney, Agent, or Firm* — Taft Stettinius & Hollister LLP (57) ABSTRACT

A method for preparing a grid alloy of a lead battery, comprising the following steps: (1) preparing an aluminum-lanthanum-cerium rare earth mother alloy by using a molten salt electrolysis method; (2) melting the aluminum-lanthanum-cerium rare earth mother alloy with sodium and partial lead and uniformly stirring same to prepare an intermediate alloy; and (3) melting the intermediate alloy with calcium, tin and remaining lead and uniformly stirring same to form a grid alloy of a lead battery.

9 Claims, 4 Drawing Sheets

(51) Int. Cl.
      *C25C 3/36*       (2006.01)
      *H01M 4/68*       (2006.01)
      *H01M 4/73*       (2006.01)

(56) References Cited

FOREIGN PATENT DOCUMENTS

| | | | |
|---|---:|---|---|
| CN | 101245425 | A * | 8/2008 |
| CN | 101245425 | A | 8/2008 |
| CN | 102660697 | A * | 9/2012 |
| CN | 102660697 | A | 9/2012 |
| CN | 103762369 | A | 4/2014 |
| CN | 106684391 | A | 5/2017 |
| CN | 107146890 | A | 9/2017 |
| CN | 108467968 | A | 8/2018 |
| GB | 2096639 | A | 10/1982 |
| WO | 2008105559 | A1 | 9/2008 |

OTHER PUBLICATIONS

International Search Report; State Intellectual Property Office of the P.R. China; International Application No. PCT/CN2018/112133; dated Jan. 16, 2019; 4 pages.
First Search of Chinese Prior Application; Chinese Patent Application No. 2018101161668; 1 page.
Chinese First Office Action; The State Intellectual Property Office of People's Republic of China; Chinese Patent Application No. 201810116166.8; dated Mar. 8, 2019; 3 pages.

* cited by examiner

METHOD FOR PREPARING GRID ALLOY OF LEAD BATTERY

CROSS REFERENCE TO RELATED APPLICATIONS

This application is a U.S. national stage filing of International Patent Application No. PCT/CN2018/112133 filed Oct. 26, 2018, which claims priority to Chinese Patent Application No. 201810116166.8 filed Feb. 6, 2018, the contents of each application hereby incorporated by reference in their entirety.

TECHNICAL FIELD

The present application relates to a field of lead battery production and, for example, to a method for preparing a grid alloy of a lead battery.

BACKGROUND

Lead batteries belong to a reversible direct current power supply. A lead battery can convert chemical energy into electric energy and also can convert electric energy into chemical energy. The lead battery is mainly composed of electrolyte, a battery jar and a plate group. The electrolyte in the lead battery is sulfuric acid solution. The plate group is mainly composed of a positive plate, a negative plate and a partition plate. The partition plate is mainly used for storing the electrolyte and serves as a gas channel for oxygen recombination to prevent active substances from falling off and prevent short circuit between the positive electrode and the negative electrode.

In the production and processing process of a storage battery, a grid is used as a carrier and a conductor of the lead paste. The lead paste can become a polar plate only after being filled and coated on the grid and cured and dried. The polar plate is the core of the lead battery, because the grid is like a framework and has direct effect on the strength and service life of the whole polar plate. The grid of the lead battery has a shunting effect on the polar plate, so that a current is uniformly distributed in the active substances, and plays roles of current collection, current convergence and current transmission on a current conductor. Therefore, the grid of the lead battery is a key for determining the performance of the battery.

Patent publication number CN101656312B discloses an alloy material for a high-energy accumulator grid and a preparation method thereof. The alloy material is prepared from the chemical compositions in percentage by weight: 0.06-0.14 percent of Ca, 0.1-2.0 percent of Sn, 0.01-0.06 percent of Al, 0.01-0.1 percent of Zn, 0.001-2.0 percent of rare earth and the balance being Pb. The rare earth is one or two of Er and Yb, or the mixture of Ho, Er, Tm and Yb. The preparation method includes the following steps: adding Ca, Al and the rare earth to a crucible furnace according to the compounding ratio; vacuumizing, introducing nitrogen gas for protection, and smelting the mixture at the temperature of 600-900° C.; adding Pb, Sn and Zn according to the compounding ratio, smelting at the temperature of 550-650° C. and evenly mixing the mixture, standing and then sampling (regulating alloy compositions according to sample compositions), then fishing out dregs, keeping the mixture at the above temperature for 0.5-3 hours, and then cooling; controlling the cooling speed at 102-105 K/S.

Chinese Patent Publication No. CN103762369A discloses a rare-earth lead alloy for a lead-acid storage battery positive grid. The rare-earth lead alloy is characterized by being prepared by smelting the following component materials by weight percent: 0.01 to 0.12 percent of calcium, 1.2 to 2.0 percent of tin, 0.02 to 0.05 percent of aluminum, 0.01 to 0.12 percent of lanthanum, 0.01 to 0.12 percent of yttrium, 0.02 to 0.15 percent of cerium and the balance being lead.

Patent publication number CN102329982B discloses a lead-antimony rare-earth anode grid alloy and a preparation method thereof. The lead-antimony rare-earth anode grid alloy consists of the following metal elements by weight percent: 0.5 to 1 percent of antimony, 0.005 to 0.1 percent of lanthanum, 0.005 to 0.1 percent of samarium and the balance being lead. In the preparation process, lead-lanthanum and lead-samarium alloys were prepared as mother alloys; pure antimony was added to the melted lead solution and stirred until it was completely melted; and then lead-lanthanum and lead-samarium mother alloys were added, mixed and smelted to obtain the lead-antimony rare-earth anode grid alloy.

Rare earth metals have high melting points, which are usually about 1000° C. or even higher. The existing method for preparing lead rare earth alloy at such high temperature leads to high energy consumption and burning loss. The utilization ratio of rare earth metals is generally less than 80%, and the content of rare earth elements is not easy to control. Moreover, rare earths may contain high contents of impurities. Direct preparation requires rare earth metal simple substances. However, rare earths are present in the form of oxides in nature. The production and purification of rare earth simple substances is energy-intensive and costly. The prepared alloy may also be at the high level of impurities.

SUMMARY

The following is a summary of the subject matter described herein in detail. This summary is not intended to limit the scope of the claims.

The present application provides a method for preparing a grid alloy of a lead battery, which overcomes the problems in the related art of high energy consumption, large burning loss, high impurity content, low utilization rate of rare earth metal, etc. in the preparation of a rare earth alloy.

Provided is a method for preparing a grid alloy of a lead battery, wherein components of the grid alloy of the lead battery are:

tin 1.0-2.0 wt %, calcium 0.05-0.10 wt %, lanthanum 0.02-0.05 wt %, cerium 0.02-0.05 wt %, sodium 0.02-0.05 wt %, and aluminum 0.01-0.04 wt % with the balance being lead;

wherein the preparation method includes the following steps:

(1) preparing an aluminum-lanthanum-cerium rare earth mother alloy by using a molten salt electrolysis method;

(2) melting the aluminum-lanthanum-cerium rare earth mother alloy with sodium and partial lead and uniformly stirring the same to prepare an intermediate alloy;

(3) melting the intermediate alloy with calcium, tin and the remaining lead and uniformly stirring the same to prepare the grid alloy of the lead battery.

Optionally, a method for preparing the aluminum-lanthanum-cerium rare earth mother alloy by using the molten salt electrolysis method includes the following steps:

(a) adding a mixture of lanthanum oxide, cerium oxide and aluminum oxide into an electrolyte system, wherein a mass ratio of the mixture to the electrolyte system is 1:50-1:10;

(b) carrying out molten salt electrolysis eutectoid reaction to obtain the aluminum-lanthanum-cerium rare earth mother alloy.

Molten salt electrolysis is a metallurgical process in which electric energy is used for heating and converted into chemical energy, and salts of certain metals are melted and used as electrolytes for electrolysis to extract and purify metals. When the melted electrolyte comes into contact with the metal, a certain potential difference, i.e. an electrode potential, will generate between the two. Two electrodes are inserted into the same molten salt and direct current is applied with an applied voltage, and when the voltage reaches a certain value, some components in the molten salt are decomposed.

Optionally, components of the electrolyte system are: lanthanum fluoride 30-40 wt %, cerium fluoride 30-40 wt %, lithium fluoride 10-20 wt %, and barium fluoride 10-20 wt %. The fluoride electrolysis process can be applied to preparation of rare earth metals with low melting point.

Optionally, an amount of each component in the mixture of lanthanum oxide, cerium oxide and aluminum oxide is lanthanum oxide 10-40 wt %, cerium oxide 10-40 wt % and aluminum oxide 30-80 wt %. Since the ratio of a metal element to an oxygen element in each oxide is different, the mass ratio in each oxide mixture is different from that in the final obtained grid alloy.

Optionally, an electrolytic bath used for the molten salt electrolysis is a graphite crucible with a graphite sheet as an anode and a molybdenum rod as a cathode, and a molybdenum crucible is used as an alloy receiver; the molten salt electrolysis is performed at an anode current density of 1.0-1.5 A/cm$^2$, a cathode current density of 15-20 A/cm$^2$, and an electrolysis temperature of 850-950° C. Each parameter of the molten salt electrolysis is a condition range with better results summarized on the basis of a large number of experiments.

Optionally, components of the aluminum-lanthanum-cerium rare earth mother alloy are: aluminum 10-50 wt %, lanthanum 25-50 wt %, and cerium 25-50 wt %.

Optionally, components of the intermediate alloy are: aluminum 1-4 wt %, lanthanum 2-5 wt %, cerium 2-5 wt %, and sodium 2-5 wt % with the balance being lead.

Optionally, the intermediate alloy is prepared by using a vacuum melting method, which is: putting lead into a vacuum melting furnace, melting, and then heating to 950-1000° C., adding the aluminum-lanthanum-cerium rare earth mother alloy and sodium with stirring, stirring for another 20-40 minutes and then cooling, and casting an ingot at the temperature of 550-650° C. The vacuum melting method is a special smelting technology for smelting metal and alloy under vacuum. One of the main disadvantages of atmospheric melting and casting is that alloy components (mainly some relatively active elements) are not easy to be accurately controlled due to burning loss. However, the vacuum melting is not polluted by surrounding atmosphere, and metal liquid is separated from contact with oxygen and nitrogen in the atmosphere, so that in vacuum melting, the content of the active elements in the alloy can be strictly controlled. The alloy components are controlled in a narrow range, thereby ensuring the performance, quality and stability of the alloy.

Optionally, step (3) comprises putting the lead into a lead melting furnace, melting, and then heating to 620-670° C., adding the intermediate alloy with stirring, and stirring for another 10-15 minutes for uniform mixing; adding calcium with stirring, and stirring for another 10-15 minutes after the calcium is melted; adding tin with stirring, stirring for another 10-15 minutes after the tin is melted, and then cooling, and casting an ingot at the temperature of 550-600° C. Each parameter of the vacuum melting method is a condition range with better results summarized on the basis of a large number of experiments.

Optionally, the lead is electrolytic lead with lead content ≥99.994%.

Compared with the method in which a rare earth element simple substance is prepared from an oxide and then a rare earth mother alloy is directly prepared by using the simple substance, the rare earth mother alloy prepared by using the molten salt electrolysis method in the present application has stable components, less impurity content and higher utilization rate of raw materials. The rare earth oxide is directly used as the raw material, the raw material is more easily obtained, and the utilization rate of the rare earth metal reaches more than 90%. An intermediate alloy is prepared to produce the working alloy, so that the components are more uniform, and the process has high controllability.

Other aspects can be understood after the detailed description and the drawings are read and understood.

DETAILED DESCRIPTION

The technical solutions of the present application are further described below through specific examples. Those who skilled in the art should understand that the examples described herein are merely used for a better understanding of the present application and should not be construed as specific limitations to the present application.

Figure 1:
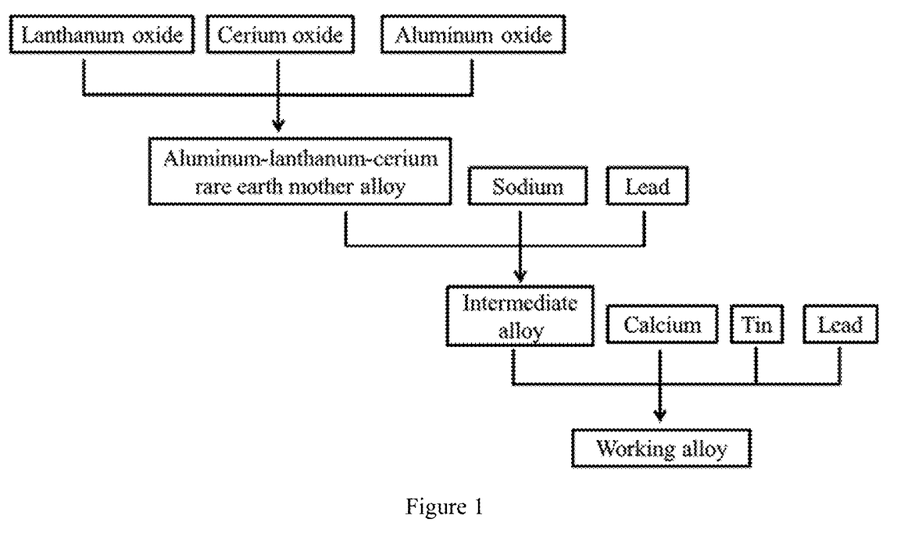
FIG. 1 is a flowchart of a method for preparing a grid alloy of a lead battery according to a specific embodiment of the present application.

FIG. 1 is a flowchart of a method for preparing a grid alloy of a lead battery according to a specific embodiment of the present application. As shown in FIG. 1, an aluminumlanthanum-cerium rare earth mother alloy was prepared, then an intermediate alloy was prepared by using the aluminum-lanthanum-cerium rare earth mother alloy, sodium and partial lead, and finally, the grid alloy of the lead battery was prepared by using the intermediate alloy, calcium, tin and remaining lead.

EXAMPLE 1

An aluminum-lanthanum-cerium rare earth mother alloy was prepared by using a molten salt electrolysis method.

The mass ratio of components in an electrolyte system was $LaF_3:CeF_3:LiF:BaF_2=40:40:10:10$. The mass ratio of added raw materials was $La_2O_3:CeO_2:Al_2O_3=25:25:50$. The molten salt electrolysis was carried out at the current strength of 2800 A, the anode current density of 1.0-1.2 $A/cm^2$, the cathode current density of 15-18 $A/cm^2$, and the electrolysis temperature of 880-910° C. The electrolyte mass in the electrolytic furnace was 100 kg. 5 kg raw materials were added, and 2.6 kg alloy was prepared. In the alloy, the content of lanthanum was 39.2%, and the content of cerium was 37.1%. The utilization rate of the metal lanthanum was 95.9%, and the utilization rate of the metal cerium was 95.1%. The components of the prepared aluminum-lanthanum-cerium rare earth mother alloy are shown in Table 1, where Fe, Si, C, Cu, Ag, Sb are impurities, which is the same in examples described below.

TABLE 1

Aluminum-lanthanum-cerium rare earth mother alloy component analysis results/wt %

| La | Ce | Al | Fe | Si | C | Cu | Ag | Sb |
|---|---|---|---|---|---|---|---|---|
| 39.2 | 37.1 | 22.3 | 0.08 | 0.02 | 0.01 | 0.002 | 0.0004 | 0.001 |

EXAMPLE 2

An aluminum-lanthanum-cerium rare earth mother alloy was prepared by using the molten salt electrolysis method.

The mass ratio of components in an electrolyte system was $LaF_3:CeF_3:LiF:BaF_2=30:30:20:20$. The mass ratio of added raw materials was $La_2O_3:CeO_2:Al_2O_3=40:30:30$. The molten salt electrolysis was carried out at the current strength of 2700 A, the anode current density of 1.2-1.4 $A/cm^2$, the cathode current density of 18-20 $A/cm^2$, and the electrolysis temperature of 920-950° C. The electrolyte mass in the electrolytic furnace was 250 kg. 5 kg raw materials were added, and 3.2 kg alloy was prepared. In the alloy, the content of lanthanum was 49.8%, and the content of cerium was 36.2%. The utilization rate of the metal lanthanum was 92.2%, and the utilization rate of the metal cerium was 93.6%. The components of the prepared aluminum-lanthanum-cerium rare earth mother alloy are shown in Table 2.

TABLE 2

Aluminum-lanthanum-cerium rare earth mother alloy component analysis results/wt %

| La | Ce | Al | Fe | Si | C | Cu | Ag | Sb |
|---|---|---|---|---|---|---|---|---|
| 49.8 | 36.2 | 12.5 | 0.06 | 0.02 | 0.02 | 0.001 | 0.0003 | 0.001 |

EXAMPLE 3

An aluminum-lanthanum-cerium rare earth mother alloy was prepared by using the molten salt electrolysis method.

The mass ratio of components in an electrolyte system was $LaF_3:CeF_3:LiF:BaF_2=40:40:10:10$. The mass ratio of added raw materials was $La_2O_3:CeO_2:Al_2O_3=15:15:70$. The molten salt electrolysis was carried out at the current strength of 2600 A, the anode current density of 1.3-1.5 $A/cm^2$, the cathode current density of 17-20 $A/cm^2$, and the electrolysis temperature of 850-880° C. The electrolyte mass in the electrolytic furnace was 50 kg. 5 kg raw materials were added, and 2.1 kg alloy was prepared. In the alloy, the content of lanthanum was 28.4%, and the content of cerium was 27.3%. The utilization rate of the metal lanthanum was 90.1%, and the utilization rate of the metal cerium was 92.5%. The components of the prepared aluminum-lanthanum-cerium rare earth mother alloy are shown in Table 3.

TABLE 3

Aluminum-lanthanum-cerium rare earth mother alloy component analysis results/wt %

| La | Ce | Al | Fe | Si | C | Cu | Ag | Sb |
|---|---|---|---|---|---|---|---|---|
| 28.1 | 27.3 | 43.1 | 0.07 | 0.01 | 0.02 | 0.002 | 0.0005 | 0.001 |

EXAMPLE 4

An intermediate alloy was prepared by using the aluminum-lanthanum-cerium rare earth mother alloy prepared in Example 1.

25 kg pure lead was put into a vacuum smelting furnace. The lead was melted and then heated to 980° C. 2.5 kg rare earth mother alloy prepared in Example 1 and 1.0 kg metal sodium were added with stirring, and stirred for another 30 minutes, and then cooled. After dregs were fished out, ingot casting was carried out at 600° C., to obtain 28.2 kg alloy. In the alloy, the content of lanthanum was 3.38%, the content of cerium was 3.29%, the content of aluminum was 1.76% and the content of sodium was 3.44%. The components of the prepared intermediate alloy are shown in Table 4.

TABLE 4

Intermediate alloy component analysis results/wt %

| La | Ce | Al | Na | Fe | Si | C |
|---|---|---|---|---|---|---|
| 3.38 | 3.29 | 1.76 | 3.44 | 0.008 | 0.002 | 0.001 |
| Cu | Ag | Bi | Zn | Sb | Pb | — |
| 0.0002 | 0.0003 | 0.003 | 0.0003 | 0.0008 | Remainder | — |

EXAMPLE 5

An intermediate alloy was prepared by using the aluminum-lanthanum-cerium rare earth mother alloy prepared in Example 2.

25 kg pure lead was put into a vacuum smelting furnace. The lead was melted and then heated to 1000° C. 3.0 kg rare earth mother alloy prepared in Example 2 and 1.5 kg metal sodium were added with stirring, and stirred for 30 another minutes, and then cooled. After dregs were fished out, ingot casting was carried out at 600° C., to obtain 29.2 alloy. In the alloy, the content of lanthanum was 4.96%, the content of cerium was 3.68%, the content of aluminum was 1.23% and the content of sodium was 4.88%. The components of the prepared intermediate alloy are shown in Table 5.

TABLE 5

Intermediate alloy component analysis results/wt %

| La | Ce | Al | Na | Fe | Si | C |
|---|---|---|---|---|---|---|
| 4.96 | 3.68 | 1.23 | 4.88 | 0.006 | 0.002 | 0.002 |
| Cu | Ag | Bi | Zn | Sb | Pb | — |
| 0.0003 | 0.0004 | 0.002 | 0.0003 | 0.0007 | Remainder | — |

EXAMPLE 6

An intermediate alloy was prepared by using the aluminum-lanthanum-cerium rare earth mother alloy prepared in Example 3.

20 kg pure lead was put into a vacuum smelting furnace. The lead was melted and then heated to 950° C. 2.0 kg rare earth mother alloy prepared in Example 3 and 0.5 kg metal sodium were added with stirring, and stirred for another 30 minutes, and then cooled. After dregs were fished out, ingot casting was carried out at 600° C., to obtain 22.3 kg alloy. In the alloy, the content of lanthanum was 2.42%, the content of cerium was 2.38%, the content of aluminum was 3.66% and the content of sodium was 2.12%. The components of the prepared intermediate alloy are shown in Table 6.

TABLE 6

Intermediate alloy component analysis results/wt %

| La | Ce | Al | Na | Fe | Si | C |
|---|---|---|---|---|---|---|
| 2.42 | 2.38 | 3.66 | 2.12 | 0.007 | 0.001 | 0.002 |
| Cu | Ag | Bi | Zn | Sb | Pb | |
| 0.0004 | 0.0005 | 0.002 | 0.0004 | 0.0007 | Remainder | |

EXAMPLE 7

A finished product (working alloy) was prepared by using the intermediate alloy prepared in Example 4.

1000 kg lead was put into a lead melting furnace, melted by heating, and then heated to 630-660° C. 10 kg intermediate alloy prepared in Example 4 was added with stirring, and stirred for another 15 minutes for uniform mixing. 0.6 kg calcium was added with stirring. Stirring continued for 15 minutes after the calcium was melted. 20 kg tin was added with stirring. Stirring continued for 15 minutes after the tin was melted. The temperature was reduced. After dregs were fished out, ingot casting was carried out at the temperature of 550° C., and to obtain a working alloy. The components of the prepared working alloy are shown in Table 7.

TABLE 7

Working alloy component analysis results/wt %

| Sn | Ca | La | Ce | Al | Na | Bi | Cu |
|---|---|---|---|---|---|---|---|
| 1.92 | 0.055 | 0.032 | 0.032 | 0.015 | 0.033 | 0.005 | 0.001 |
| As | Ag | Zn | Ni | Sb | Fe | Cd | Pb |
| 0.001 | 0.005 | 0.0005 | 0.0002 | 0.001 | 0.0005 | 0.0002 | Remainder |

EXAMPLE 8

A finished product (working alloy) was prepared by using the intermediate alloy prepared in Example 5.

1000 kg lead was put into a lead melting furnace, melted by heating, and then heated to 650-670° C. 10 kg intermediate alloy prepared in Example 5 was added with stirring, and stirred for another 15 minutes for uniform mixing. 0.8 kg calcium was added with stirring. Stirring continued for 15 minutes after the calcium was melted. 16 kg tin was added with stirring. Stirring continued for 15 minutes after the tin was melted. The temperature was reduced. After dregs were fished out, ingot casting was carried out at the temperature of 550° C., to obtain a working alloy. The components of the prepared working alloy are shown in Table 8.

TABLE 8

Working alloy component analysis results/wt %

| Sn | Ca | La | Ce | Al | Na | Bi | Cu |
|---|---|---|---|---|---|---|---|
| 1.53 | 0.073 | 0.048 | 0.036 | 0.011 | 0.046 | 0.005 | 0.001 |
| As | Ag | Zn | Ni | Sb | Fe | Cd | Pb |
| 0.001 | 0.005 | 0.0005 | 0.0002 | 0.001 | 0.0005 | 0.0002 | Remainder |

EXAMPLE 9

A finished product (working alloy) was prepared by using the intermediate alloy prepared in Example 6.

1000 kg lead was put into a lead melting furnace, melted by heating, and then heated to 620-650° C. 10 kg intermediate alloy prepared in Example 6 was added with stirring, and stirred for another 15 minutes for uniform mixing. 1.0 kg calcium was added with stirring. Stirring continued for 15 minutes after the calcium was melted. 12 kg tin was added with stirring. Stirring continued for 15 minutes after the tin was melted. The temperature was reduced. After dregs were fished out, ingot casting was carried out at the temperature of 550° C., to obtain a working alloy. The components of the prepared working alloy are shown in Table 9.

TABLE 9

Working alloy component analysis results/wt %

| Sn | Ca | La | Ce | Al | Na | Bi | Cu |
|---|---|---|---|---|---|---|---|
| 1.13 | 0.092 | 0.022 | 0.021 | 0.036 | 0.021 | 0.005 | 0.001 |
| As | Ag | Zn | Ni | Sb | Fe | Cd | Pb |
| 0.001 | 0.005 | 0.0005 | 0.0002 | 0.001 | 0.0005 | 0.0002 | Remainder |

COMPARATIVE EXAMPLE 1

Method for Preparing a Common Lead-Calcium-Tin Alloy

A certain amount of pure lead was put into a lead melting furnace. The lead was melted and then heated to 580-600° C. After dregs were fished out, the melted lead was stirred at a high speed. A calcium-aluminum mother alloy (Ca/Al: 75:25 in weight) whose weight was equivalent to 0.13% of the pure lead was added, and stirred for another 15 minutes. Pure tin whose weight was equivalent to 1.5% of the pure lead was added, and continuously stirred for 15 minutes. Then the temperature was reduced. After dregs were fished out, ingot casting was carried out at the temperature of 550° C., to obtain a lead-calcium-tin alloy. The alloy components are shown in Table 10.

TABLE 10

Common lead-calcium-tin alloy component analysis results/wt %

| Sn | Ca | Al | Bi | Cu | As | Ag | Zn | Ni | Sb | Fe | Cd | Pb |
|---|---|---|---|---|---|---|---|---|---|---|---|---|
| 1.216 | 0.074 | 0.022 | 0.003 | 0.001 | 0.001 | 0.005 | 0.0005 | 0.0002 | 0.001 | 0.0005 | 0.0002 | Remainder |

COMPARATIVE EXAMPLE 2

Method for Preparing a Lead Rare Earth Alloy by Directly Adding Rare Earth Elements A certain amount of pure lead was put into a lead melting furnace. The lead was melted and then heated to 880-900° C. After dregs were fished out, the melted lead was stirred at a high speed. Pure lanthanum whose weight was equivalent to 0.04% of the pure lead and pure cerium whose weight was equivalent to 0.04% of the pure lead were added, and stirred at a high speed for 10 minutes. Stirring continued and the temperature was reduced to 560-580° C. Metal sodium whose weight was equivalent to 0.06% of the pure lead was added, and stirred at a high speed for 10 minutes. A calcium-aluminum mother alloy (Ca/Al: 75:25 in weight) whose weight was equivalent to 0.13% of the pure lead was added and stirred for another 15 minutes. Pure tin whose weight was equivalent to 1.5% of the pure lead was added and stirred for another 15 minutes. Then the temperature was reduced. After dregs were fished out, ingot casting was carried out at the temperature of 550° C., to obtain a lead rare earth alloy. The alloy components are shown in Table 11.

TABLE 11

Component analysis results of the lead rare earth alloy prepared by directly adding rare earth elements/wt %

| Sn | Ca | La | Ce | Al | Na | Bi | Cu |
|---|---|---|---|---|---|---|---|
| 1.223 | 0.076 | 0.026 | 0.027 | 0.025 | 0.032 | 0.004 | 0.001 |

| As | Ag | Zn | Ni | Sb | Fe | Cd | Pb |
|---|---|---|---|---|---|---|---|
| 0.001 | 0.005 | 0.0005 | 0.0002 | 0.001 | 0.0005 | 0.0002 | Remainder |

EXAMPLE 10

Metallographic Examination:

The lead alloy was made into a sample with the diameter of 10 mm and the length of 20 mm. The sample was ground by a metallographic grinder. In the grinding process, the rotation speed of the grinding disc was controlled to be 800 r/min, and water was used as a lubricating agent and cooling liquid. 300 # and 600 # metallographic abrasive papers were used for carrying out rough grinding, and then 1500 # and 2000 # abrasive papers were used for carrying out fine grinding. The ground sample was polished by using a polymer synthetic fabric. After polishing, the sample was washed with water for a secondary cleaning, corroded by using a mixed solution of analytically pure acetic acid and hydrogen peroxide (the volume ratio was 1:3), soaked and washed in absolute ethyl alcohol, and blown dry by using an electric blower. The texture structure of the surface of the alloy was observed under a metallographic microscope.

Figure 2:
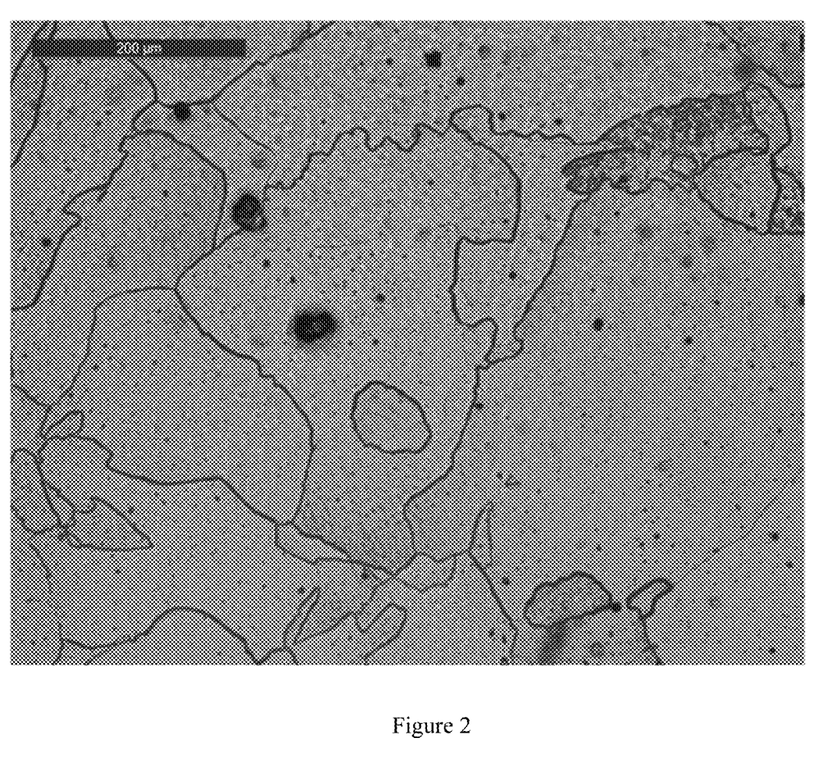
FIG. 2 is a diagram showing results of metallographic examination of a grid alloy prepared in comparative example 1.
Figure 3:
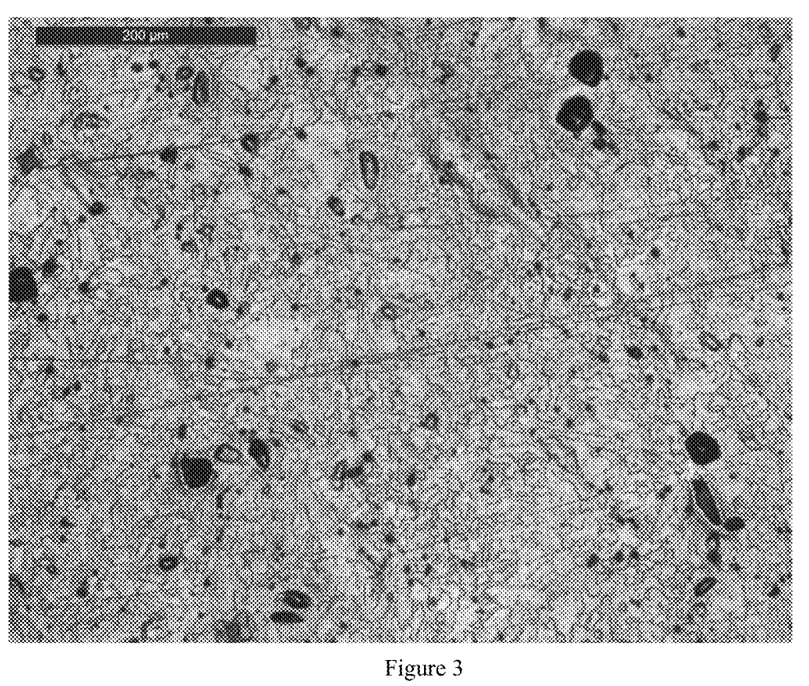
FIG. 3 is a diagram showing results of metallographic examination of a grid alloy prepared in comparative example 2.
Figure 4:
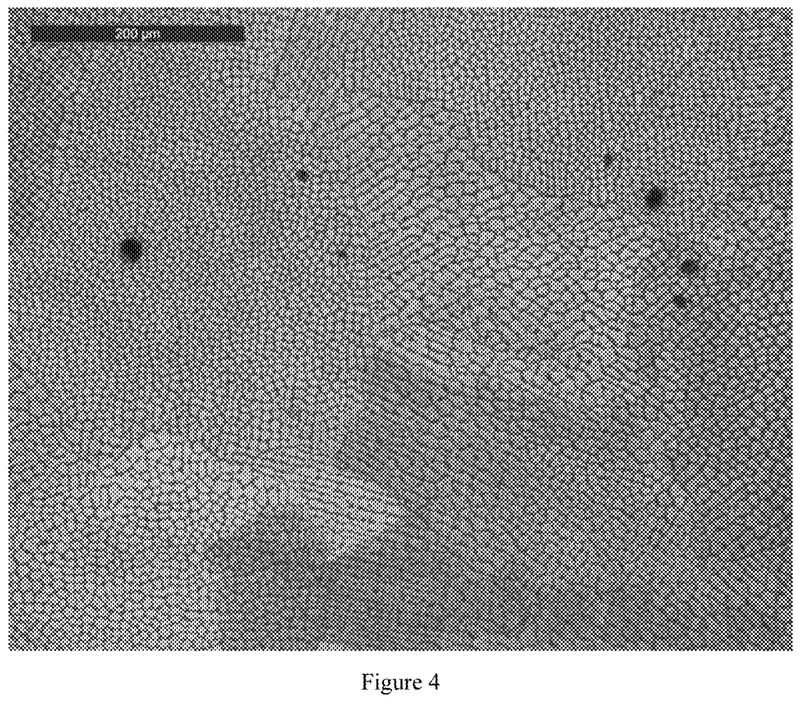
FIG. 4 is a diagram showing results of metallographic examination of a grid alloy prepared in example 7.

The alloys prepared in Comparative example 1, Comparative example 2 and Example 7 were detected. The detection results are respectively shown in FIGS. 2, 3 and 4. It can be seen that the common lead-calcium alloy (prepared in Comparative example 1) had coarse crystal grains of more than 200 μm and obvious segregation; the common lead rare earth alloy (prepared in Comparative example 2) had slightly fine crystal grains but irregular crystal boundaries, and also had black speck-shaped or butterfly-shaped impurities or segregation points; the lead rare earth alloy prepared in Example 7 had finer crystal grains of about 10 regular grain boundaries and less segregation.

EXAMPLE 11

Figure 5:
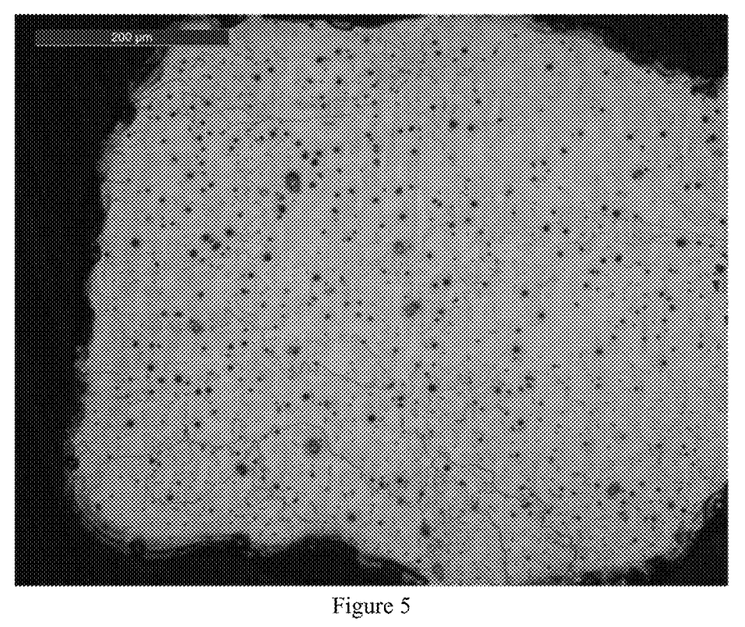
FIG. 5 is a diagram showing results of metallographic examination of a grid which was prepared using the grid alloy prepared in the comparative example 1.
Figure 6:
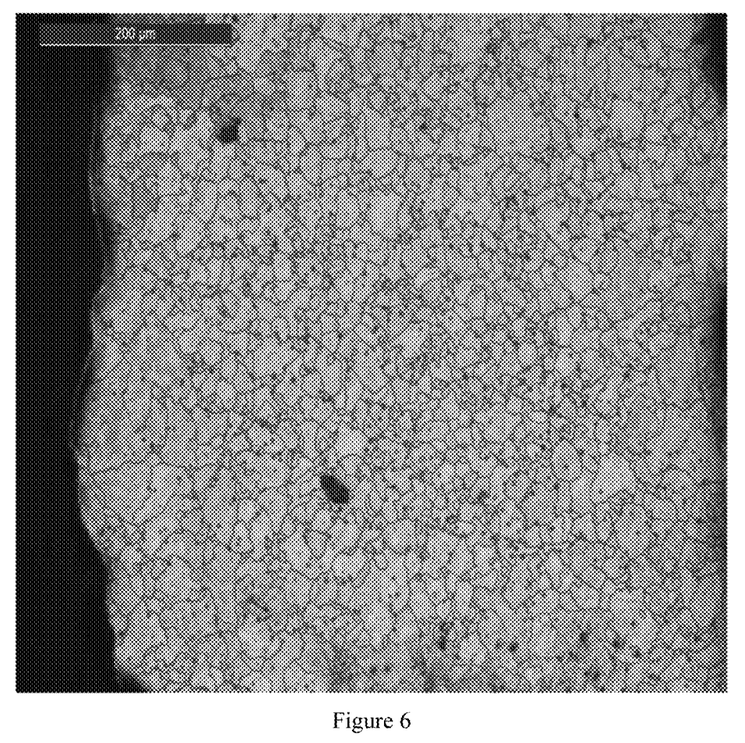
FIG. 6 is a diagram showing results of metallographic examination of a grid which was prepared using the grid alloy prepared in the comparative example 2.
Figure 7:
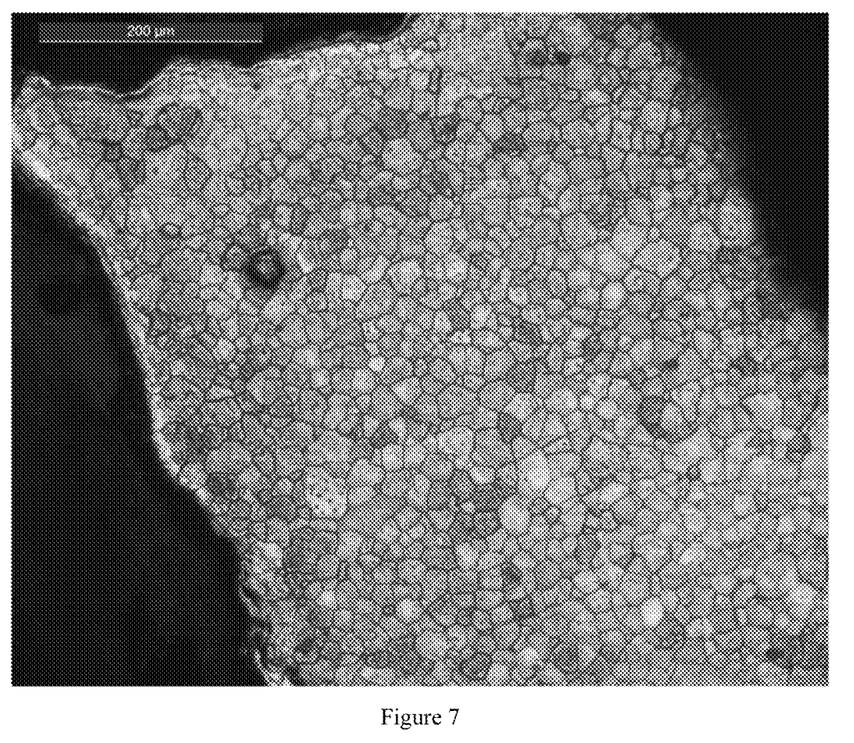
FIG. 7 is a diagram showing results of metallographic examination of a grid which was prepared using the grid alloy prepared in the example 7.

The grid alloys prepared in Comparative example 1, Comparative example 2 and Example 7 were respectively cast into grids. Metallographic structures of these grids were detected. The detection results are respectively shown in FIGS. 5, 6 and 7. It can be seen from metallography of the grids that the grid cast by the common lead-calcium-tin alloy (prepared in Comparative example 1) had large crystal grains, irregular crystal boundaries, and multiple intermetallic compounds were precipitated; the grid cast by the common lead rare earth alloy (prepared in Comparative example 2) had fine crystal grains but very uneven sizes, and irregular crystal boundaries, and a certain amount of intermetallic compounds were precipitated; the grid caste by the lead rare earth alloy prepared in Example 7 had fine and uniformly distributed crystal grains, regular grain boundaries and fewer impurities.

EXAMPLE 12

The alloys prepared in Example 7, Comparative example 1 and Comparative example 2 were respectively cast into grids. A constant current corrosion test was carried out by introducing 50 mA current into 1.28 g/mL sulfuric acid solution. In the test process, the corrosion area was 5 cm$^2$, and the corrosion duration was 20 days. The weight loss data of the sample after corrosion was tested to calculate the average corrosion weight loss per day, so as to measure the corrosion resistance of the alloy sample. The lower the average corrosion weight loss per day is, the stronger the corrosion resistance of the alloy is. The results are shown in Table 12. It can be seen that the grid alloy prepared by the preparation method of the present application has better corrosion resistance.

TABLE 12

Corrosion resistance detection results

| Alloy | Before corrosion/g | After corrosion/g | Weight loss/mg | Corrosion speed mg/d |
|---|---|---|---|---|
| Comparative example 1 | 48.6565 | 48.0138 | 642.70 | 30.60 |
| Comparative example 2 | 48.0112 | 47.4646 | 546.60 | 26.03 |
| Example 7 | 47.9411 | 47.6292 | 311.90 | 14.85 |

EXAMPLE 13

The alloys prepared in Example 7, Comparative example 1 and Comparative example 2 were respectively cast into grids. The grids were produced into a polar plate respectively, and a battery was assembled to perform a cycle test. A charge-discharge cycle with 100% depth of discharge (100% DoD) was performed. The battery was dissected after 200 cycles were completed. The size variation of the grid was measured to measure the creep resistance of the alloy. The smaller the size variation is, the stronger the creep resistance of the alloy is. The results are shown in Table 13. It can be seen that the grid alloy prepared by the preparation method of the present application has better creep resistance.

TABLE 13

Creep resistance detection results

| Alloy | Initial height/mm | Height after cycles/mm | Height increase/mm | Height change rate |
|---|---|---|---|---|
| Comparative example 1 | 136.12 | 137.58 | 1.46 | 1.07% |
| Comparative example 2 | 136.15 | 137.46 | 1.31 | 0.96% |
| Example 7 | 136.13 | 136.76 | 0.63 | 0.46% |

EXAMPLE 14

Figure 8:
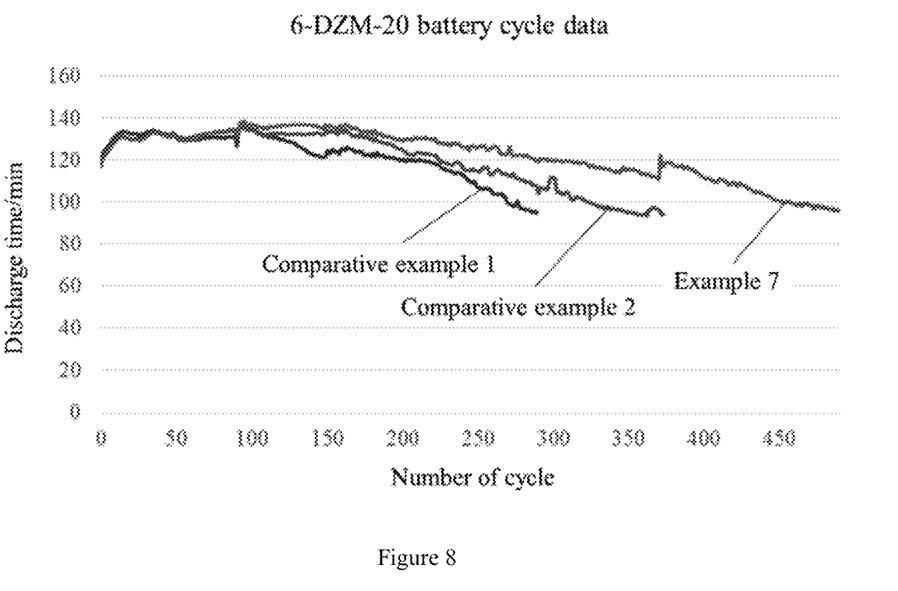
FIG. 8 is a diagram showing results of battery cycle life detection in example 14.

The alloys prepared in Example 7, Comparative example 1 and Comparative example 2 were respectively cast into grids. The grids were produced into a polar plate respectively, and a battery was assembled to perform a cycle test. A charge-discharge cycle with 100% DoD was performed. The test was terminated when the discharge capacity of the battery was lower than 96 minutes three successive times, and the battery was determined to be invalid. The number of cycles completed before the battery was invalid was counted and recorded as the cycle life of the battery. The results are shown in FIG. 8. The cycle life of the battery produced by the grid alloy (prepared in Example 7) by the preparation method of the present application reached 491 times, the cycle life of the battery produced by the common alloy prepared in Comparative example 1 was 292 times, and the cycle life of the battery produced by the common lead rare earth alloy prepared in Comparative example 2 was 368 times, which indicates that the cycle life of the battery can be greatly prolonged by the grid alloy prepared by the preparation method of the present application.

What is claimed is:

1. A method for preparing a grid alloy of a lead battery, wherein components of the grid alloy of the lead battery are: tin 1.0-2.0 wt %, calcium 0.05-0.10 wt %, lanthanum 0.02-0.05 wt %, cerium 0.02-0.05 wt %, sodium 0.02-0.05 wt %, and aluminum 0.01-0.04 wt % with the balance being lead;
   wherein the preparation method comprises the following steps:
   (1) preparing an aluminum-lanthanum-cerium rare earth mother alloy by using a molten salt electrolysis method;
   (2) melting the aluminum-lanthanum-cerium rare earth mother alloy with sodium and partial lead and uniformly stirring same to prepare an intermediate alloy;
   (3) melting the intermediate alloy with calcium, tin and remaining lead and uniformly stirring same to prepare the grid alloy of the lead battery;
   wherein a method for preparing the aluminum-lanthanum-cerium rare earth mother alloy by using the molten salt electrolysis method comprises the following steps:
   (a) adding a mixture of lanthanum oxide, cerium oxide and aluminum oxide into an electrolyte system, wherein a mass ratio of the mixture to the electrolyte system is 1:50-1:10;
   (b) carrying out molten salt electrolysis eutectoid reaction to obtain the aluminum-lanthanum-cerium rare earth mother alloy.

2. The preparation method of claim 1, wherein the intermediate alloy is prepared by using a vacuum melting method, which is: putting lead into a vacuum melting furnace, melting, and then heating to 950-1000° C., adding aluminum-lanthanum-cerium rare earth mother alloy and sodium with stirring, stirring for another 20-40 minutes and then cooling, and casting an ingot at the temperature of 550-650° C.

3. The preparation method of claim 1, wherein components of the electrolyte system are: lanthanum fluoride 30-40 wt %, cerium fluoride 30-40 wt %, lithium fluoride 10-20 wt %, and barium fluoride 10-20 wt %.

4. The preparation method of claim 1, wherein an amount of each component in the mixture of lanthanum oxide, cerium oxide and aluminum oxide is lanthanum oxide 10-40 wt %, cerium oxide 10-40 wt % and aluminum oxide 30-80 wt %.

5. The preparation method of claim 1, wherein an electrolytic bath used for molten salt electrolysis is a graphite crucible with a graphite sheet as an anode, a molybdenum rod as a cathode, and a molybdenum crucible as an alloy receiver; the molten salt electrolysis is performed at an anode current density of 1.0-1.5 A/cm$^2$, a cathode current density of 15-20 A/cm$^2$, and an electrolysis temperature of 850-950° C.

6. The preparation method of claim 1, wherein components of the aluminum-lanthanum-cerium rare earth mother alloy are: aluminum 10-50 wt %, lanthanum 25-50 wt %, and cerium 25-50 wt %.

7. The preparation method of claim 1, wherein components of the intermediate alloy are: aluminum 1-4 wt %, lanthanum 2-5 wt %, cerium 2-5 wt %, and sodium 2-5 wt % with the balance being lead.

8. The preparation method of claim 1, wherein step (3) comprises putting the lead into a lead melting furnace, melting, and then heating to 620-670° C., adding the intermediate alloy with stirring, and stirring for another 10-15 minutes for uniform mixing; adding calcium with stirring, and stirring for another 10-15 minutes after the calcium is melted; adding tin with stirring, stirring for another 10-15 minutes after the tin is melted, and then cooling, and casting an ingot at the temperature of 550-600° C.

9. The preparation method of claim 1, wherein the lead is electrolytic lead with lead content ≥99.994%.

* * * * *